(12) United States Patent
Huff

(10) Patent No.: US 8,464,504 B1
(45) Date of Patent: Jun. 18, 2013

(54) EDGER AND TRIMMER FOR RIDING MOWER

(76) Inventor: Joseph I. Huff, Cincinnati, OH (US)

(*) Notice: Subject to any disclaimer, the term of this patent is extended or adjusted under 35 U.S.C. 154(b) by 21 days.

(21) Appl. No.: 13/199,842

(22) Filed: Sep. 12, 2011

(51) Int. Cl.
*A01D 34/00* (2006.01)

(52) U.S. Cl.
USPC .............................................. 56/12.7; 56/13.7

(58) Field of Classification Search
USPC ............. 56/11.6, 12.7, 13.7, 16.7, 16.9, 17.1, 56/17.2, 17.5
See application file for complete search history.

(56) References Cited

U.S. PATENT DOCUMENTS

| | | | | | |
|---|---|---|---|---|---|
| 2,623,128 | A | * | 12/1952 | Myles | 379/437 |
| 2,938,323 | A | * | 5/1960 | Shaver et al. | 56/16.9 |
| 3,676,989 | A | * | 7/1972 | Slayton | 56/10.5 |
| 4,170,099 | A | * | 10/1979 | Owens | 56/16.9 |
| 4,453,372 | A | * | 6/1984 | Remer | 56/13.7 |
| 4,642,976 | A | * | 2/1987 | Owens | 56/16.9 |
| 4,718,221 | A | * | 1/1988 | Wessel et al. | 56/16.9 |
| 5,040,360 | A | * | 8/1991 | Meehleder | 56/11.6 |
| 5,065,566 | A | * | 11/1991 | Gates | 56/12.7 |
| 5,159,803 | A | | 11/1992 | Earley, Jr. | |
| 5,226,284 | A | * | 7/1993 | Meehleder | 56/11.6 |
| 5,303,532 | A | * | 4/1994 | Phillips | 56/12.7 |
| 5,309,701 | A | | 5/1994 | McGuerty | |
| 5,857,315 | A | * | 1/1999 | Keane | 56/16.9 |
| 6,032,443 | A | | 3/2000 | Aldrich | |
| 6,094,896 | A | * | 8/2000 | Lane | 56/13.7 |
| 6,484,484 | B1 | | 11/2002 | Thomas | |
| 6,779,325 | B1 | | 8/2004 | Robillard, II | |
| 6,810,647 | B1 | | 11/2004 | Evrikoz | |
| 6,986,238 | B1 | | 1/2006 | Bloodworth | |
| 7,165,382 | B2 | | 1/2007 | Mitchell, Jr. | |
| 7,165,383 | B1 | | 1/2007 | Luton, Jr. | |
| 7,549,278 | B2 | | 6/2009 | McMahan | |
| 7,658,057 | B1 | | 2/2010 | O'Dell | |

* cited by examiner

*Primary Examiner* — Thomas B Will
*Assistant Examiner* — Mai Nguyen
(74) *Attorney, Agent, or Firm* — Charles R. Wilson

(57) ABSTRACT

A combination edger and trimmer is for mounting on a riding lawn mower's deck. The edger/trimmer comprises a deck mount plate, an intermediate plate and a motor mount plate. The three plates are offset from one another with the intermediate plate hingeably attached to the deck mount plate and also to the motor mount plate. An electric motor with a cutting head is attached to the motor mount plate. The edger/trimmer is positioned in rest, edging, or trimming positions by manually moving the plates about their hinge points.

14 Claims, 5 Drawing Sheets

EDGER AND TRIMMER FOR RIDING MOWER

FIELD OF THE INVENTION

This invention relates to a combination edger and trimmer. More particularly, the invention relates to a combination electric edger and trimmer for use on a riding mower.

BACKGROUND OF THE INVENTION

Power equipment for grass and weed control has long been available. Lawn mowers in particular have evolved from push mowers to walk-behind power mowers for smaller plots of land and riding mowers for larger plots of land. The lawn mower, regardless of type, adequately cuts nearly all grass and weeds on any land plot. However, they are not able to neatly cut along an edge of a sidewall, driveway, fence, tree, flower bed, etc. for a well manicured lawn appearance.

For the homeowner or other person responsible for maintenance of the land, it is desirable and, some would say, necessary to use an edger or trimmer. Edgers and trimmers are power driven and greatly ease the job of edging and trimming. They do require separate operations which are time consuming. Furthermore, specialized lawn equipment of this nature is costly and requires storage space.

There have been numerous attempts by others to modify a lawn mower with a power edger and/or trimmer. The attempts have been made on walk-behind lawn mowers as well as riding lawn mowers. Feasible equipment of this nature would be welcomed by many homeowners, commercial landscapers, and municipal workers responsible for maintaining roadway areas and other public lands such as parks.

Despite a need for a walk-behind or riding mower with the capability to also perform an edging and/or trimming operation, no truly feasible mower is known to exist. Walk-behind mowers with an edging and trimming feature are known as evidenced by the disclosures of U.S. Pat. Nos. 5,159,803, 7,165,383B1, and 7,658,057B1. The motor which drives the main grass cutting blades of the lawn mower is also used to drive a separate edger/trimmer unit mounted on a deck of the mower. This requires added belts and drive shafts. The initial cost of the lawn mower necessarily must be greater and, most troubling, is the greatly increased likelihood of equipment failure.

Riding mowers with edger and trimmer features are also known. For example, U.S. Pat. Nos. 6,032,443, 6,779,325B1, 6,986,238B1, 7,165,382B2, and 7,549,278 all describe such mowers. The riding mowers of U.S. Pat. Nos. 6,032,443 and 6,986,238B1 have been modified simply to allow what appears to be a conventional edger or trimmer to be mounted on the mower. As such, they can be operated independently of the mower's cutting. The cost is additive and the edger and trimmer appear to be awkward to use. The riding mowers of U.S. Pat. Nos. 6,779,325B1, 7,165,382B2 and 7,549,278B2 have edger and trimmer units mounted to each mower's deck and are powered by such mower's main power take-off. They appear convenient to use, but would seem to be prone to break-down. Changing a riding mower's drive belt is arduous enough as it is without having to also contend with a separately mounted drive belt for the edger/trimmer.

It is quite apparent that others have long ago recognized the of one piece of lawn care equipment which will mow, edge and trim. Many attempts have been made to fill a long recognized need. To a very limited extent, the need has been met. What has not been developed to date is unitary lawn care equipment which not only mows, edges, and trims, but does so without an inordinate added cost and without costly repairs.

There has now been developed an edger and trimmer designed to be mounted on a mower deck of a riding mower. The edger/trimmer is battery powered. No separate drive belt is needed. It is easily manually moved from an out of the way rest position to either an edging position or a trimming position. The edger/trimmer of the invention provides a very practical solution to a long standing and well recognized need.

SUMMARY OF THE INVENTION

A combination edger and trimmer is for mounting on a mower deck of a riding lawnmower. The edger/trimmer comprises a deck mount plate, an intermediate plate and a motor mount plate, all hingeably connected together. The intermediate plate has three offset legs wherein a proximal leg is hingeably connected to the deck mount plate and a distal leg is hingeably connected to the motor mount plate. An electric motor with a cutting head is attached to the motor mount plate. In use, the electric motor with its cutting head is moved manually from a rest position to an edging position, and finally to a trimming position through the hingeably connected plates.

DETAILED DESCRIPTION OF THE INVENTION

The combination edger and trimmer of the invention is particularly useful for mounting on a mower deck of a zero turn riding lawn mower. A more conventional steering wheel riding lawn mower also can utilize the edger/trimmer of the invention. Its use is not restricted to any one make or model of riding mower. The riding mower can be a mower designed for light residential use, for commercial use, or for heavy-duty roadway use. All such uses are contemplated, though the description to follow and the drawings are directed to a residential use riding lawn mower.

Figure 1:
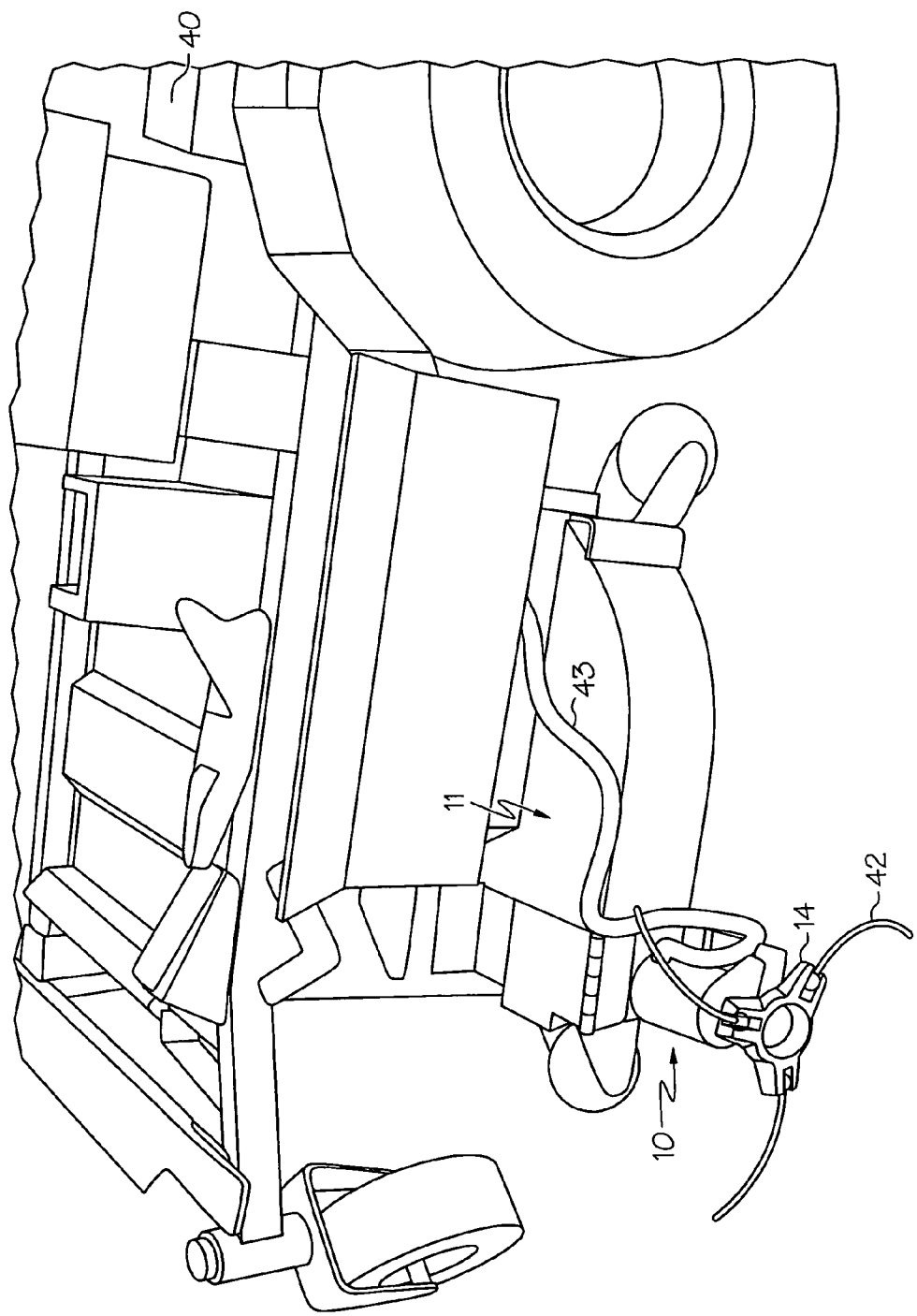
FIG. 1 is an environmental view of the edger/trimmer of the invention mounted on a riding mower's deck.

With reference to FIG. 1, there is shown an environmental view of a zero turn lawn riding mower with the edger/trimmer 10 of the invention mounted on a mower deck 11 of the riding mower. The edger/trimmer 10 is shown in a trimming position.

Figure 2:
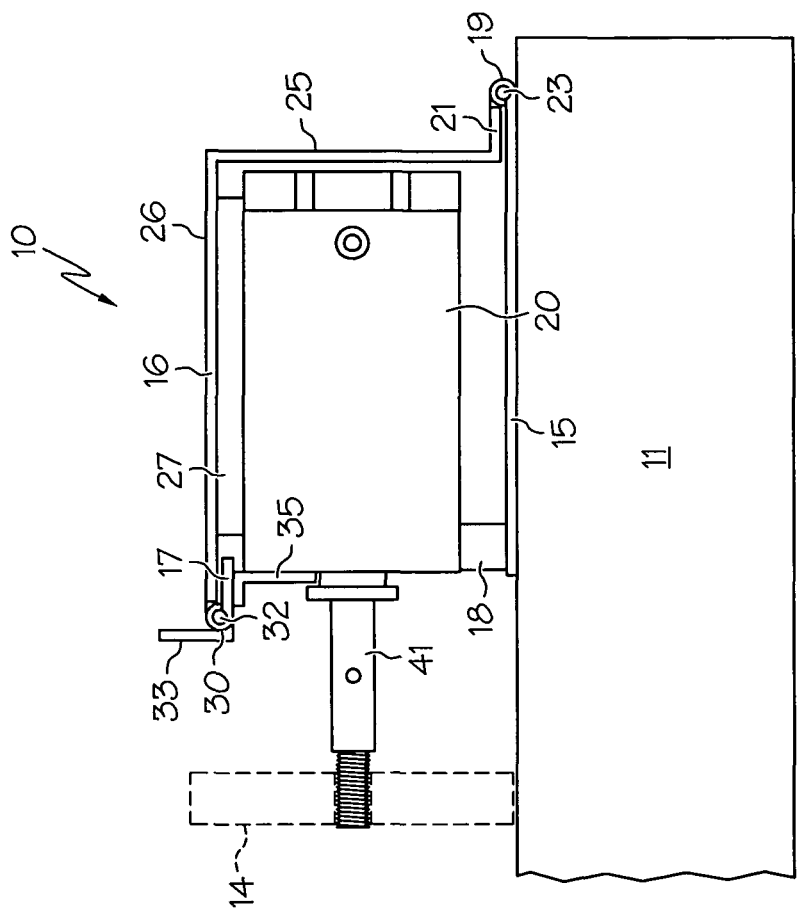
FIG. 2 is a view in elevation showing the edger/trimmer of FIG. 1 in a rest position.
Figure 3:
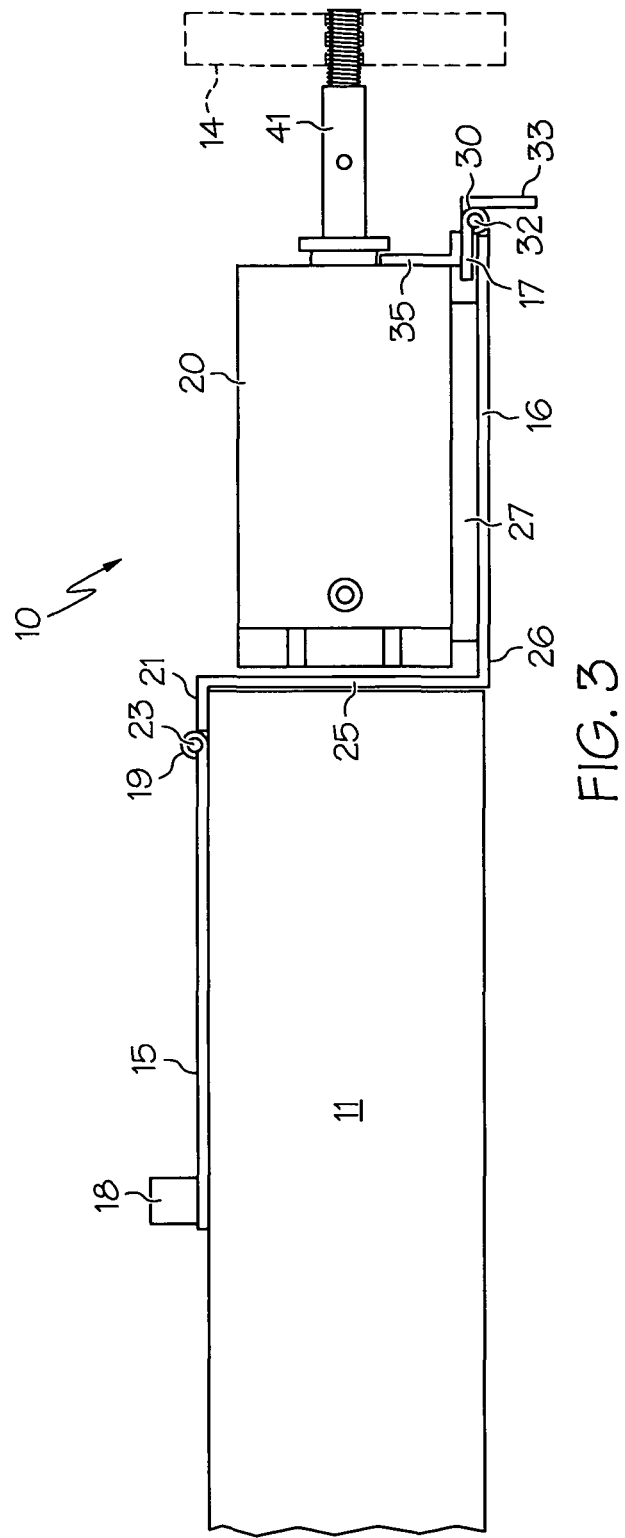
FIG. 3 is a view in elevation showing the edger/trimmer of FIG. 1 in an edging position.
Figure 4:
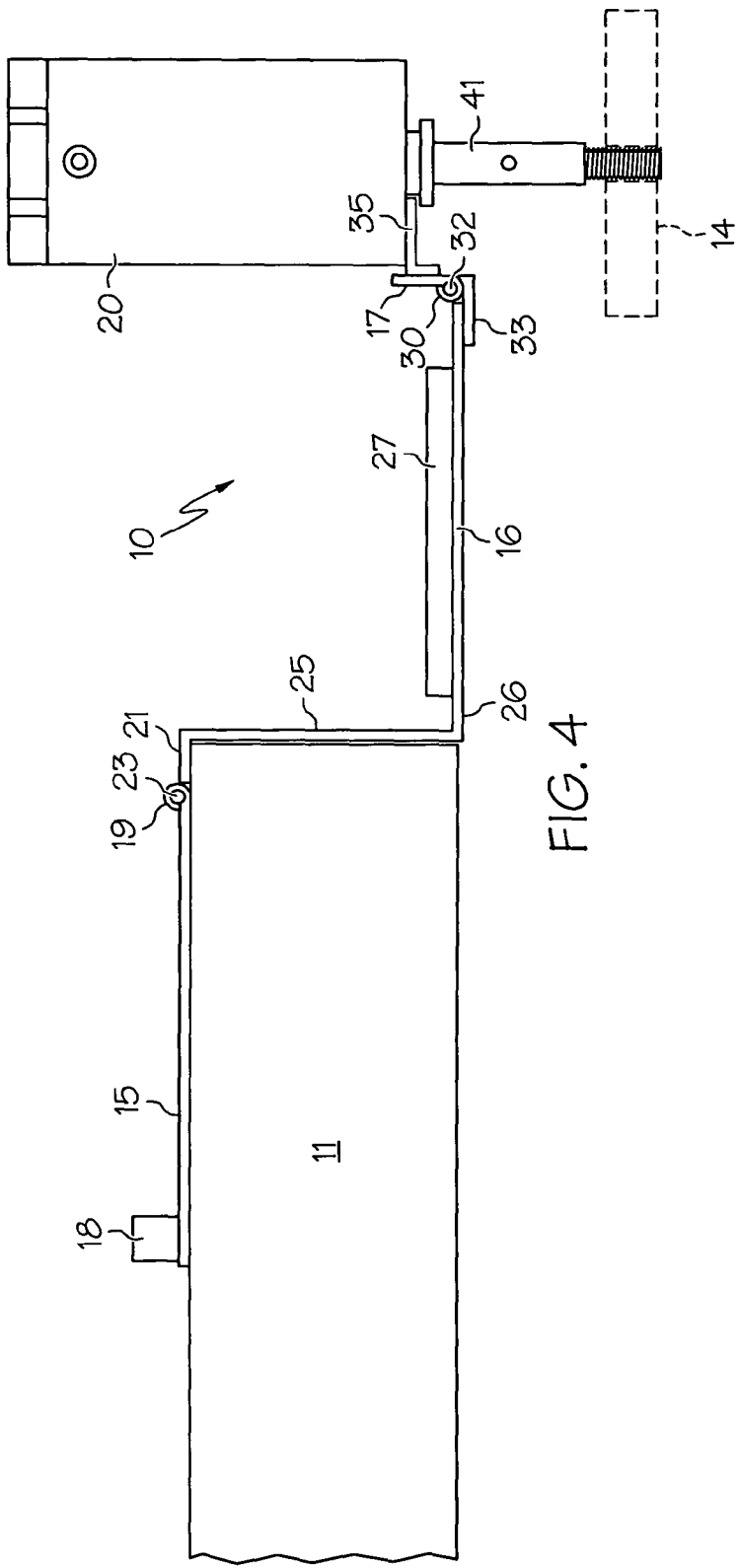
FIG. 4 is a view in elevation showing the edger/trimmer of FIG. 1 in a trimming position.

FIGS. 2-4 show the edger/trimmer 10 isolated from the riding mower and in three positions. The edger/trimmer 10 is in a rest position in FIG. 2, in an edging position in FIG. 3, and in a trimming position in FIG. 4. In all instances, the orientation of the edger/trimmer's cutting head 14 determines the particular position.

As best seen in FIG. 4, the edger/trimmer is comprised of three plates hinged together. The three plates are a deck mount plate 15, an intermediate plate 16, and a motor mount plate 17. The deck mount plate 15 is a flat rigid plate, preferably having a rest pad 18 near a first free edge and hinge knuckles 19 at an opposed second edge. The rest pad 18 is an elongated rigid bar. A small centered rigid block is also adequate. It is positioned and secured at or near a first free edge of the deck mount plate. It has a sufficient height to receive an electric motor 20 of the edger/trimmer when in a rest position. The motor 20 is fully supported by the rest pad 18 in a substantially horizontal plane. As such, it is better able to withstand normal jarring as the riding mower travels over bumpy terrain without damage. The mount plate 15 is welded to the mower deck, though any other permanent means of attachment can be used, e.g. a set of bolts and nuts.

The intermediate plate 16 of the edger/trimmer 10 is hingeably attached to the deck mount plate 15. The intermediate plate 16 has three rigid legs, offset one from another. A proximal leg 21 has mating hinge knuckles (not evident in FIG. 4) for interaction with the hinge knuckles 19 of the deck mount plate 15. A hinge pin 23 extending through the two sets of mated knuckles hingeably attaches the two plates together. The proximal leg is relatively short to serve as an offset to ensure that the electric motor clears the mount plate and sits on the rest pad 18 when the edger/trimmer is in a rest position. Extending downwardly at a substantial right angle from the proximal leg 21 is a mid leg. A distal leg 26 extends at a substantial right angle from the mid leg 25 and away from the proximal leg 21. The proximal and distal legs lie in substantially parallel planes. A magnet 27 is secured to the top side of the distal leg 26 to receive and hold in place the electric motor 20 when its cutting head 14 is in a rest or edging position as seen in FIGS. 2 and 3.

Again with reference to FIG. 4, the motor mount plate 17 is rigid and is hingeably attached to the distal leg 26 of the intermediate plate 16. A set of knuckles 30 on a free end of the intermediate plate 16 and mating knuckles (not evident in FIG. 4) on the free end of the motor mount plate 17 with a hinge pin 32 extending through the knuckles hingeably attaches the two plates. An extended leg 33 preferably is a part of the motor mount plate 17. Its purpose is to limit the travel of the mount plate 17 and its associated relatively heavy electric motor 20. The electric motor 20 is prevented from moving beyond a point where its cutting head is horizontally disposed by contact of the extended leg 33 with the underside of the distal leg 26. A motor bracket 35 is attached to a free end of the motor mount plate 17. The motor bracket 35 attached to the electric motor 20 is in turn permanently attached to the motor mount plate 17.

The edger/trimmer 10 is powered by electric. A six or twelve volt battery is adequate. The battery typically found on riding mowers for starting and lighting purposes can be used as well to power the edger/trimmer. The larger twelve volt battery is preferred.

The electric motor 20 depicted in FIG. 1 is a high torque high rpm motor powered by a twelve volt battery 40 (seen in FIG. 1). The battery 40 provides all the electric power needs of the mower. Instead, a battery dedicated to a single use, i.e. to solely power the edger/trimmer and its controls can as well be used. The electric motor 20 includes a drive shaft 41 and a cutting head 14. The cutting head 14 has replaceable plastic blades or lines 42 (seen in FIG. 1). Other electric motors are feasible, provided they can provide sufficient rotary power to properly edge and trim. The cutting head 14 as well is available in various styles. As shown, the cutting head 14 is a quick change head with four flexible cutting lines attached to a center spool.

Now with reference to FIG. 1, an electric wire 43 leads from the battery 40 to the electric motor 20. The battery for powering the electric motor is also used for starting the mower's engine and providing other electrical requirements, e.g. lights and gauges. The battery 40 is positioned anywhere on the mower where it is out of the way, yet can be readily changed-out. Any needed component for the electric motor is provided as well known by those skilled in electrical matters. For example, an electric box relay and an activation controller is operatively connected to the electric motor. The controller can be foot operated (as shown) or hand operated.

Figure 5:
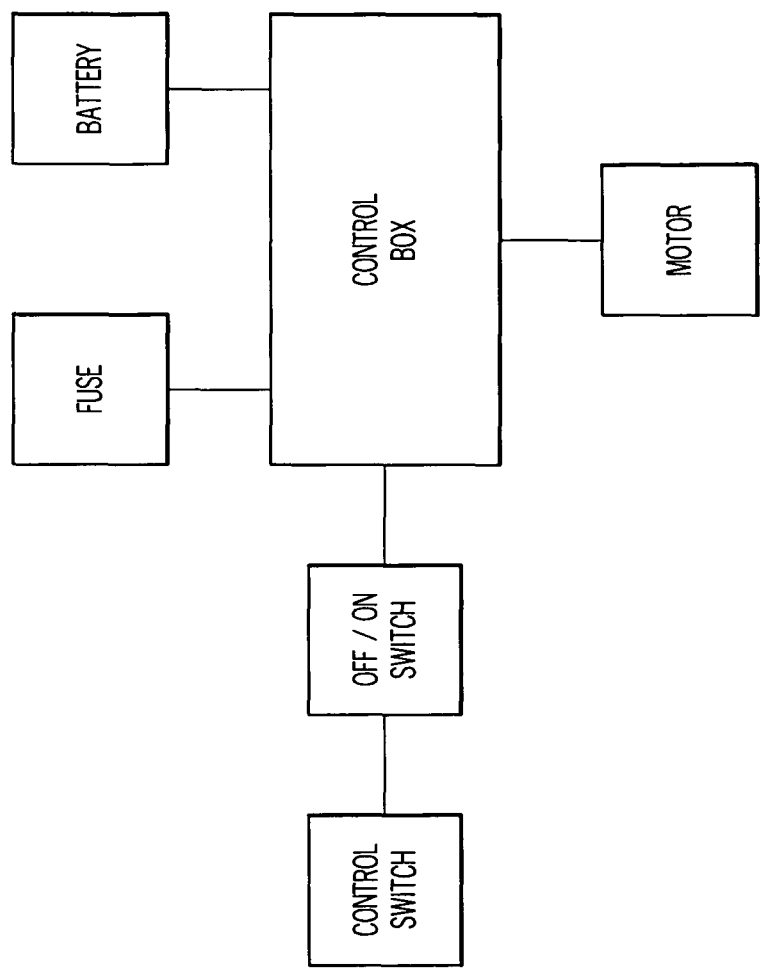
FIG. 5 is a schematic view of the FIG. 1 edger/trimmer's electrical system.

FIG. 5 is a schematic of the edger/trimmer's electrical system briefly discussed above. An enclosed Central Box is mounted on the riding mower in close proximity to the seat for the mower's operator and in close proximity to the battery for the edger/trimmer. Preferably, the operator can easily reach an off-on switch mounted on the Control Box's surface. The Battery for the edger/trimmer is also mounted on the riding mower and is connected by a suitably gauge wire, e.g. 4 gauge, to the Control Box. Another wire leads from the Control Box to a Fuse Box. Another suitably gauge wire, e.g. 18 gauge, leads from the Control Box to a Control Switch. The Control Switch is preferably mounted on the riding mower's foot pedal. It could as well be mounted on the riding mower's handles. Finally, still another suitably gauge wire, e.g. 4 gauge, leads from the Control Box to the Motor of the edger/trimmer. The Motor is grounded to the negative terminal of the Battery by a suitably gauged, e.g. 14 gauge, wire.

In use, the edger/trimmer is positioned on the riding mower's mower deck near an outer edge where it will be capable of performing its edging and trimming functions. The edger/trimmer is placed in a rest position simply by first flipping the electric motor upwardly and inwardly until the motor rests on the magnet of the mid leg. Next, the mid leg is in turn flipped upwardly and inwardly until the electric motor sits on the rest pad. It will remain in this position during a mowing operation. When an edging operation is to be performed, the motor is flipped one time so that its cutting head is oriented substantially vertically. The edging can be accomplished either while the blade of the mower is inactive or active. The electric motor is activated and inactivated as needed.

To perform a trimming operation, the electric motor of the edger/trimmer is flipped one more time so the motor's cutting head is oriented substantially horizontally. Here also, the trimming can be performed in conjunction with mowing or independently simply by activating the electric motor.

The aforedescribed double flip feature makes the edger/trimmer of the invention particularly useful in that the versatility of having both an edger and a trimmer built into one unit is highly desirable. Achieving a rest position simply by flipping the edger/trimmer is very convenient and also highly desirable.

Various optional features are included on the riding mower as desired. In particular, a guard shield is positioned on the mower deck near the edger/trimmer of the invention to prevent injury to the mower's operator.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. An electric edger/trimmer for mounting on a mower deck of a riding lawn mower, said edger/trimmer comprising:
   (a) a deck mount plate for permanent attachment to the mower deck, said plate having a first free edge and an opposed second edge;

(b) an intermediate plate for attachment to the opposed second edge of the deck mount plate wherein the intermediate plate has a first edge and an opposed second edge and further wherein the intermediate plate is comprised of a proximal leg having the first edge, a mid leg and a distal leg with the proximal and distal legs lying in substantially parallel planes and each connected to the mid leg extending at a substantial right angle to each said proximal and distal leg and further wherein the first edge of the proximal leg of the intermediate plate is hingeably connected to the opposed second edge of the deck mount plate;

(c) a motor mount plate for attachment to the intermediate plate wherein the motor mount plate is hingeably connected to the opposed second edge of the intermediate plate; and (d) an electric motor attached to the motor mount plate, said electric motor having a drive shaft connected to a cutting head for edging and trimming a lawn, wherein the electric edger/trimmer is positioned in (1) a rest position by manually moving both the motor mount plate and the intermediate plate about their respective hinge points until the electric motor rests on the deck mount plate, (2) an edging position by manually moving the intermediate plate about its attachment to the opposed second edge of the deck mount plate until the electric motor rests on the intermediate plate or (3) a trimming position by manually moving both the intermediate plate and/or the motor mount plate about their respective hinge points until fully extended.

2. The electric edger/trimmer of claim 1 further wherein the deck mount plate has a rest pad secured at the free edge of the deck mount plate for receiving the electric motor when the edger/trimmer is in the rest position.

3. The electric edger/trimmer of claim 2 wherein the rest pad is a rigid elongated bar which extends across the deck mount plate's free edge.

4. The electric edger/trimmer of claim 2 further wherein the intermediate plate has a magnet secured to a top side of the distal leg for holding the electric motor when the edger/trimmer is in the edging position.

5. The electric edger/trimmer of claim 1 wherein the electric motor is powered by a battery.

6. An electric edger/trimmer for mounting on a mower deck of a riding lawn mower, said edger/trimmer comprising:
(a) a deck mount plate for permanent attachment to the mower deck, said plate having a first free edge and an opposed second edge;
(b) an intermediate plate, having a proximal leg hingeably attached to the opposed second edge of the deck mount plate, a mid leg, and a distal leg, said proximal and distal legs lying in substantially parallel planes and the mid leg extending at a substantial right angle to the proximal and distal legs and connected thereto;
(c) a motor mount plate hingeably attached to the distal leg of the intermediate plate; and
(d) an electric motor attached to the motor mount plate, said electric motor having a drive shaft connected to a cutting head for edging and trimming a lawn, wherein the electric edger/trimmer is positioned in (1) a rest position by manually moving both the motor mount plate and the intermediate plate about their respective hinge points until the electric motor rests on the deck mount plate, (2) an edging position by manually moving the intermediate plate about its attachment to the opposed second edge of the deck mount plate until the electric motor rests on the intermediate plate or (3) a trimming position by manually moving both the intermediate plate and/or the motor mount plate about their respective hinge points until fully extended.

7. The electric edger/trimmer of claim 6 further wherein the deck mount plate has a rest pad secured at the free edge for receiving the electric motor when the edger/trimmer is in the rest position.

8. The electric edger/trimmer of claim 7 wherein the rest pad is a rigid elongated bar which extends across the deck mount plate's free edge.

9. The electric edger/trimmer of claim 8 further wherein the intermediate plate has a magnet secured to a top side of the distal leg for holding the electric motor when the edger/trimmer is in the edging position.

10. The electric edger/trimmer of claim 6 wherein the electric motor is powered by a twelve volt battery.

11. An electric edger/trimmer for mounting on a mower deck of a riding lawn mower, said edger/trimmer comprising:
(a) a deck mount plate for permanent attachment to the mower deck, said plate having a first free edge and an opposed second edge and further having a rest pad secured thereto near the first free edge;
(b) an intermediate plate, having a proximal leg hingeably attached to the opposed second edge of the deck mount plate, a mid leg, and a distal leg, said proximal and distal legs lying in substantially parallel planes and the mid leg extending at a substantial right angle to the proximal and distal legs and connected thereto, and further having a magnet secured to a top side of the distal leg for holding the electric motor when the edger/trimmer is in an edging position;
(c) a motor mount plate hingeably attached to the distal leg of the intermediate plate; and
(d) an electric motor attached to the motor mount plate, said electric motor having a drive shaft connected to a cutting head for edging and trimming a lawn, wherein the electric edger/trimmer is positioned in (1) a rest position by manually moving both the motor mount plate and the intermediate plate about their respective hinge points until the electric motor rests on the deck mount plate, (2) the edging position by manually moving the intermediate plate about its attachment to the opposed second edge of the deck mount plate until the electric motor rests on the intermediate plate or (3) a trimming position by manually moving both the intermediate plate and/or the motor mount plate about their respective hinge points until fully extended.

12. The electric edger/trimmer of claim 11 wherein the rest pad is a rigid elongated bar which extends across the free edge.

13. The electric edger/trimmer of claim 11 wherein the electric motor is battery powered.

14. The electric edger/trimmer of claim 13 wherein the electric motor is powered by a twelve volt battery.

* * * * *